(12) United States Patent
Villatel et al.

(10) Patent No.: US 11,328,055 B2
(45) Date of Patent: May 10, 2022

(54) PROCESS VERIFICATION

(71) Applicant: HEWLETT-PACKARD DEVELOPMENT COMPANY, L.P., Spring, TX (US)

(72) Inventors: Maugan Villatel, Bristol (GB); Adrian Baldwin, Bristol (GB); Gaetan Wattiau, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/606,740

(22) PCT Filed: Jan. 31, 2018

(86) PCT No.: PCT/US2018/016118
§ 371 (c)(1),
(2) Date: Oct. 19, 2019

(87) PCT Pub. No.: WO2019/152003
PCT Pub. Date: Aug. 8, 2019

(65) Prior Publication Data
US 2020/0364331 A1    Nov. 19, 2020

(51) Int. Cl.
*G06F 21/53* (2013.01)
*G06F 21/12* (2013.01)
(Continued)

(52) U.S. Cl.
CPC .............. *G06F 21/53* (2013.01); *G06F 21/12* (2013.01); *G06F 21/554* (2013.01); *G06F 21/566* (2013.01)

(58) Field of Classification Search
CPC ........ G06F 21/53; G06F 21/12; G06F 21/554; G06F 21/566; G06F 21/56
See application file for complete search history.

(56) References Cited

U.S. PATENT DOCUMENTS 6,044,475 A * 3/2000 Chung ................ G06F 11/1438
714/15
7,669,242 B2   2/2010 Sahita et al.
(Continued)

FOREIGN PATENT DOCUMENTS

EP         1674965      6/2006
WO     WO-2016064433   4/2016

OTHER PUBLICATIONS

Azab, A.M., et al., HIMA: a Hypervisor-based Integrity Measurement Agent, 2009, http://citeseerx.ist.psu.edu/viewdoc/download?doi=10.1.1.521.4448&rep=rep1&type=pdf.

*Primary Examiner* — Nelson S. Giddins
(74) *Attorney, Agent, or Firm* — HP Inc. Patent Department

(57) ABSTRACT

Examples associated with process verification are described. One example includes a process operating in a general operating environment of the system. From an isolated environment, a protection module modifies the behavior of the process by modifying data associated with the process while the process is in operation. The protection module verifies whether the behavior of the process has changed in accordance with the modification. The protection module takes a remedial action upon determining the process has been compromised.

14 Claims, 5 Drawing Sheets

(51) Int. Cl.
*G06F 21/56* (2013.01)
*G06F 21/55* (2013.01)

(56) References Cited

U.S. PATENT DOCUMENTS

| | | |
|---|---|---|
| 9,176,843 B1 | 11/2015 | Ismael et al. |
| 9,225,740 B1* | 12/2015 | Ismael .................. G06F 11/36 |
| 10,902,119 B1* | 1/2021 | Vashisht ............. G06F 9/45545 |
| 2007/0005935 A1 | 1/2007 | Khosravi et al. |
| 2008/0082772 A1 | 4/2008 | Savagaonkar et al. |
| 2008/0134321 A1 | 6/2008 | Rajagopal et al. |
| 2009/0089879 A1 | 4/2009 | Wang et al. |
| 2012/0167218 A1* | 6/2012 | Poornachandran ... G06F 21/566 726/24 |
| 2016/0371496 A1* | 12/2016 | Sell ..................... G06F 9/45558 |

\* cited by examiner

PROCESS VERIFICATION

BACKGROUND

Computer security is a primary concern in technology today. To that end, many devices employ a variety of techniques and processes to ensure that malicious attacks are not able to compromise devices. One technique may involve operating an antivirus application that seeks to prevent malicious applications from being downloaded on to a device, and/or to detect, quarantine, and otherwise mitigate the effects of malicious attacks on that device in the event of a breach.

BRIEF DESCRIPTION OF THE DRAWINGS

The present application may be more fully appreciated in connection with the following detailed description taken in conjunction with the accompanying drawings.

DETAILED DESCRIPTION

Figure 1:
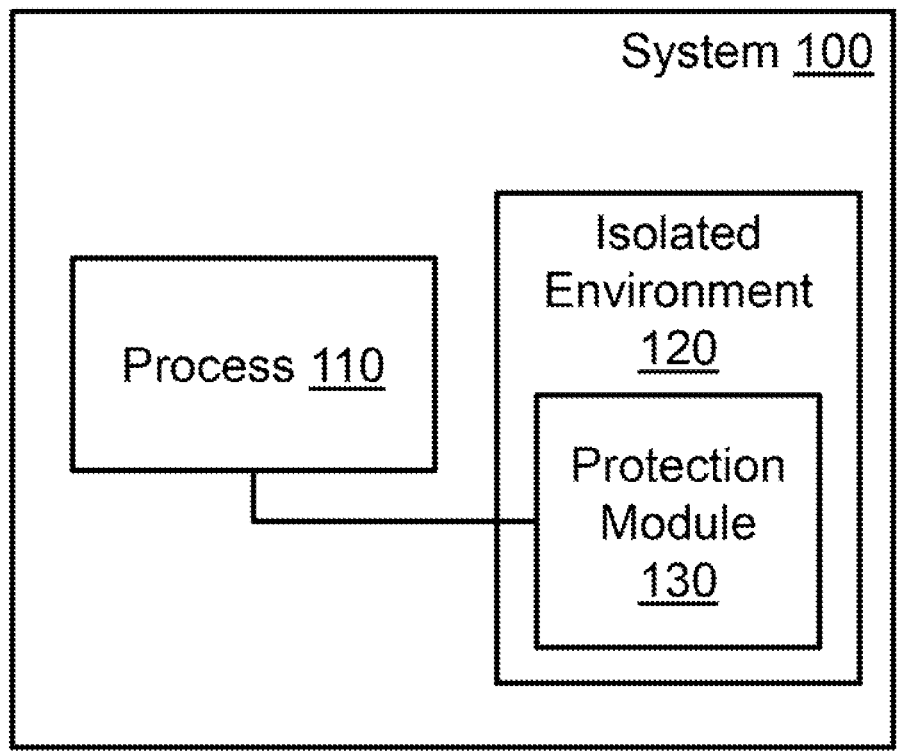
FIG. 1 illustrates an example system associated with process verification.

Systems, methods, and equivalents associated with process verification are described. As discussed above, there are many techniques for providing device security. While an antivirus application may be a frequently used technique, often, malicious attacks begin by attempting to shut down or otherwise impede the antivirus application itself. To protect the antivirus application, a protection process may be embedded in an environment that is isolated from a general environment operating the antivirus. While the antivirus itself could theoretically operate from the isolated environment, this may make it more difficult to update the antivirus against future threats, as well as potentially increasing the costs associated with delivering the isolated environment with the device. This is because the more functionality that is added to the isolated environment, the more expensive it becomes to maintain and protect the isolated environment. Additionally, it may be difficult to interpret the semantics of data structures and memory layouts from external to the file system. Consequently, processes operating from the isolated environment may be designed to be lightweight, secure, and use limited resources.

As disclosed herein, a protection process embedded in an isolated environment may be configured to prevent malicious interference with processes operating on a device's general operating environment (or other operating environments of the device). While the processes protected may be security related (e.g., antivirus applications, firewall applications, digital rights management applications), other processes may also be protected (e.g., operating systems, productivity applications, games, and so forth). This protection may be achieved by the protection process directly manipulating the data (e.g., executable instructions) used by the protected process as the protected process is operating so as to change the behavior of the protected process during operation of the protected process. The protection process may then verify that the behavior change has occurred, and trigger a repair of the protected process in the event that the behavior change is not exhibited.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

FIG. 1 illustrates an example system 100 associated with process verification. System 100 includes a process 110. Process 110 may operate within a general operating environment of system 100. As used herein a general operating environment may be an environment of a system or device that performs general purpose processing functions for the system or device. Thus the general operating environment may provide processing (e.g., by a central processing unit), memory (e.g., by a random access memory), and so forth for an operating system of the device or system, user interfacing applications of the system or device, and so forth. In various examples process 110 may perform a security function for system 100, for a device connected to system 100, for a network connected to system 100, and so forth. Thus, process 110 may be, for example, an antivirus process, a firewall process, an authentication process, a cryptography process, an intrusion prevention process, a digital rights management process, an intrusion detection process, and so forth. In other examples, process 110 may be another type of process warranting protection not primarily related to the security of system 100 or another device to which system 100 is connected. By way of illustration, process 110 may be, for example, an operating system, a game, a network service, and so forth.

FIG. 1 also includes an isolated environment 120. Isolated environment 120 may be an environment of a system that is separate from a general operating environment of that system. This separation may restrict access to data and/or processes stored on or operating from the isolated environment. Thus, certain access privileges may be needed to access data on isolated environment 120, to transmit data to isolated environment 120, and so forth. In other examples, processes operating from isolated environment 120 may be able to affect the general operating environment of system 100, while processes from the general operating environment may be restricted from affecting isolated environment 120. Isolated environment 120 may be, for example, a TrustZone system on chip, a hypervisor, a system management mode module, an embedded controller, and so forth.

Isolated environment 120 includes a protection module 130. Protection module 130 may perform various tasks associated with ensuring the continued, proper operation of process 110. To achieve this, protection module 130 may modify the behavior of process 110 by modifying data associated with process 110 while process 110 is in operation. Modifying the behavior of process 110 may apply a variety of techniques including several different techniques, and may target different portions of the data associated with process 110 during different tests, so as to facilitate verification that various portions of process 110 are operating properly. By way of illustration, protection module 130 may alter process 110 by altering executable instructions of process 110 in memory. By way of illustration, executable instructions may be modified to adjust a target of a memory access or write, to change a value manipulated by process 110. In another example, protection module 130 may alter a Boolean value in memory to trigger whether a function of process 110 operates. In another example, protection module 130 may overwrite null operation instructions with replacement instructions in the executable instructions associated with process 110. The replacement instructions may, for example, call specific functions of process 110 that may not otherwise be called. In some examples, the null operation instructions may have been inserted in process 110 at compile time by a specially configured compiler. In another example, protection module 130 may overwrite a function call in the executable instructions of process 110 to call an alternative function call. In another example, protection module 130 may alter a function pointer in memory to cause process 110 to call an alternative function. Changing which functions are called may change the behavior of process 110 in observable ways when, for examples, the functions affect predetermined portions of memory, the functions transmit signals to other components of system 100 (e.g., protection module 130), and so forth.

Protection module 130 may also verify whether the behavior of process 110 has changed in accordance with the modification. Verifying the behavior of the process may also take many forms. For example, protection value 130 may verify a value received from process 110. The value may be generated based on the behavior modified by protection module 130 and transmitted to protection module 130 by process 110. In another example, protection module 130 may verify that security reports provided by process 110 to protection module 130 include data collected as a result of the behavior modification. In this example, protection module 130 may control process 110 to provide a specific piece of data at a specific memory location or directly to protection module 130, and verify that the specific piece of data is in an expected format. In another example, protection module 130 may verify a state of an in memory value modified by process 110 during the operation of process 110. The state sought by protection module 130 may depend on how protection module 130 modified process 110. For example, protection module 130 may add function calls to the executable instructions of process 110 that cause process 110 increment an in memory value a certain number of times. Protection module 130 may then verify that the in memory value exhibits an expected value after a certain period of time, after an execution point in process 110 has been reached, and so forth.

Upon determining that process 110 has been compromised, protection module 130 may take a remedial action. The remedial action may be, for example, alerting an entity (e.g., a user, a process capable of restoring process 110 to a prior state, a company invested in the security of process 110) that process 110 has been compromised, disabling a function of system 100 (e.g., access to restricted data and/or processes on system 110), restoring process 110 to a known valid state (e.g., by retrieving a backup of process 110 from a known secure location and overwriting process 110 in a memory), turning off system 100, and so forth. A combination of these functionalities may also be appropriate.

In some examples, protection module 130 may operate in connection with a remote device such as a remote server (not shown). This may, for example, provide an additional layer of security for system 100 by preventing isolated environment 120 and/or protection module 130 from being themselves compromised by a malicious entity. Thus, protection module 130 may receive instructions for modifying the behavior of process 110 from the remote device. In this example, protection module 130 may report results of verifying process 110 to the remote device. If the remote device determines from the reported results that process 110 and/or protection module 130 have been compromised, then the remote device may be able to initiate a remedial action (e.g., restoring a component of system 100 to a prior state, alerting an administrator).

Figure 2:
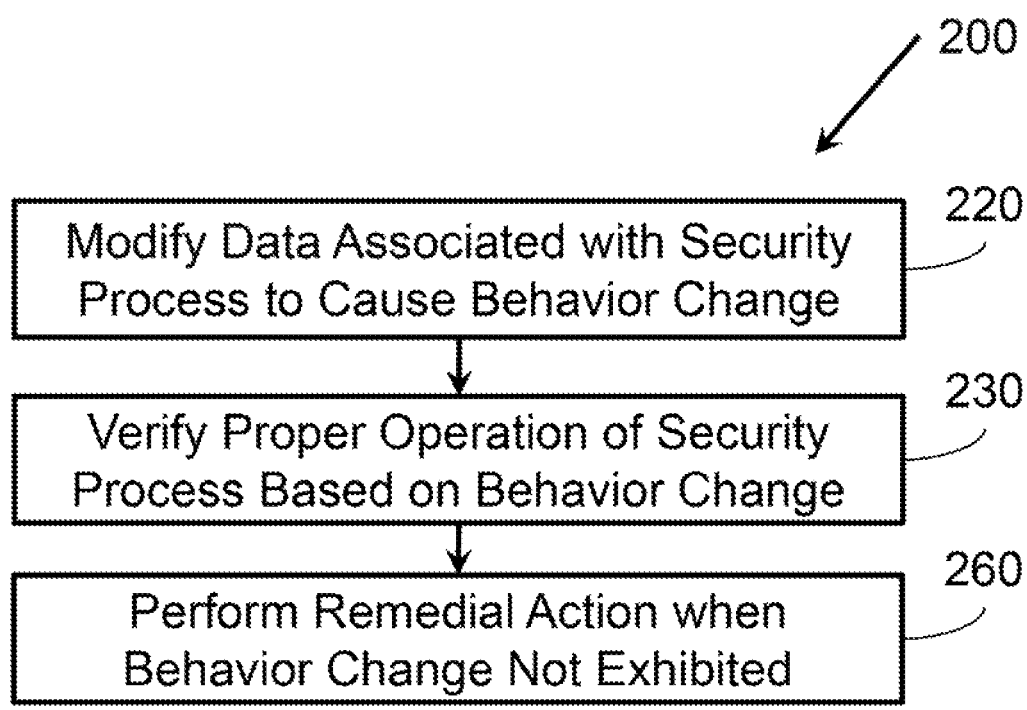
FIG. 2 illustrates a flowchart of example operations associated with process verification.

FIG. 2 illustrates an example method 200. Method 200 may be embodied on a non-transitory processor-readable medium storing processor-executable instructions. The instructions, when executed by a processor, may cause the processor to perform method 200. In other examples, method 200 may exist within logic gates and/or RAM of an application specific integrated circuit (ASIC).

Method 200 may perform various tasks associated with process verification. Method 200 includes modifying data associated with a security process at 220. The data may be modified to cause a behavior change in the security process. This data modification may be performed from a first environment of a device. The first environment may be, for example, an isolated environment. Thus, the isolated environment may be a TrustZone system on chip, a hypervisor, a system management mode module, and an embedded controller. The data modified may reside on a second environment of the device. The second environment may be a primary processing environment of the device. In some examples, the data associated with the security module may be modified by altering in memory executable instructions of the security process.

Method 200 also includes verifying proper operation of the security process at 230. The proper operation of the security process may be verified based on the behavior change. By way of illustration, proper operation of the security process may be verified by verifying a value generated based on the changed behavior and received from the security process. In another example, security reports provided by the security process may be verified to include data collected as a result of the changed behavior. In another example, a state of an in memory value may be verified to determine if the in memory value was modified by the security process during the operation of the security process.

Method 200 also includes performing a remedial action at 260. The remedial action may be performed when the security process fails to exhibit the behavior change that was sought to be triggered at action 220. The remedial action may be, for example, alerting an entity that the security process may be compromised, restoring the security process to a prior state, deactivating a functionality of a device operating the security process, and so forth.

Figure 3:
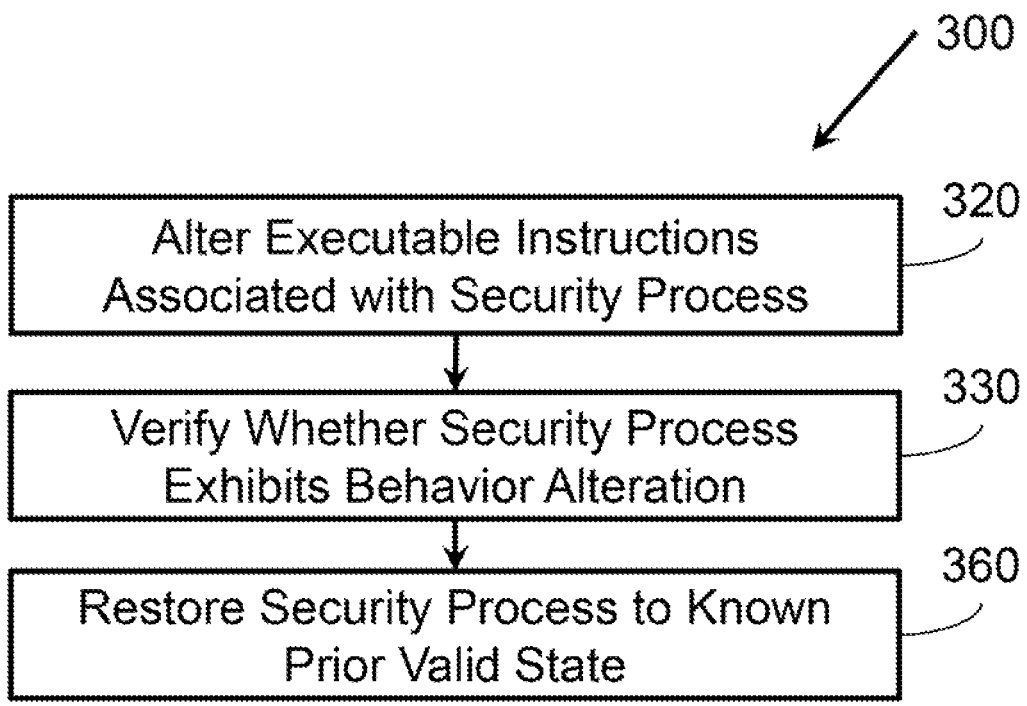
FIG. 3 illustrates another flowchart of example operations associated with process verification.

FIG. 3 illustrates a method 300. Method 300 includes altering executable instructions associated with a security process at 320. The executable instructions may be altered from a protected environment of a device. The security process may be in execution by a general operating environment of the device. Altering the executable instructions may trigger a behavior change in the security process. Method 300 may also include verifying whether the security process exhibits the behavior alteration at 330. Method 300 also includes restoring the security process to a known valid state at 360. The security process may be restored to the valid state when the security process fails to exhibit the behavior alteration.

Figure 4:
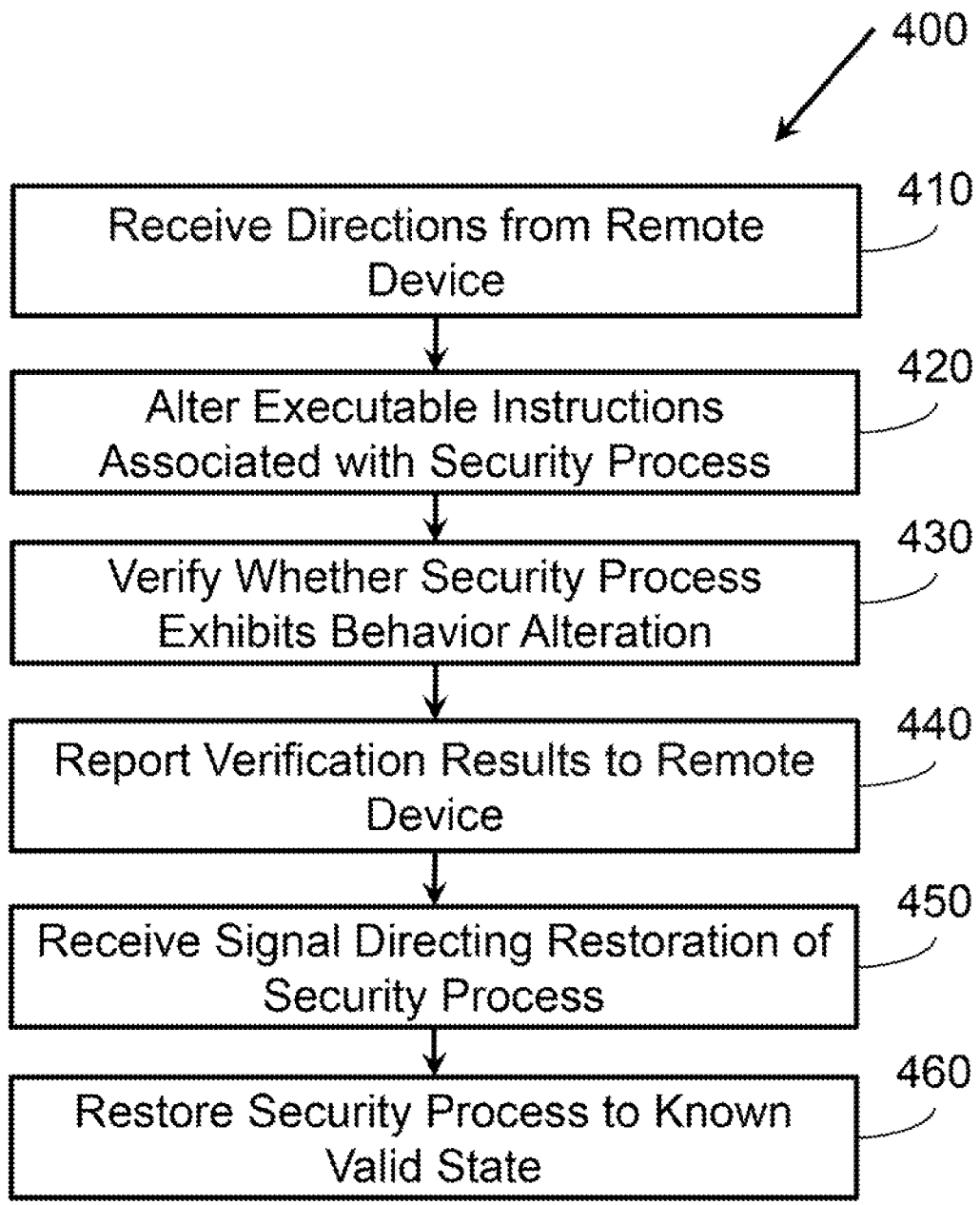
FIG. 4 illustrates another flowchart of example operations associated with process verification.

FIG. 4 illustrates a method 400 associated with process verification. Method 400 includes several actions similar to those described above with reference to method 300. For example, method 400 includes altering executable instructions associated with a security process at 420, verifying at 430 whether the security process exhibits a behavior alteration caused by altering the executable instructions, and restoring the security process to a known valid state at 460.

Method 400 also includes receiving directions from a remote device at 410. The directions may describe how to modify the behavior of the security process at action 420. Method 400 also includes reporting results of the verification to the remote device at 440. Method 400 also includes receiving a signal directing the restoration of the security process from the remote device at 460.

Figure 5:
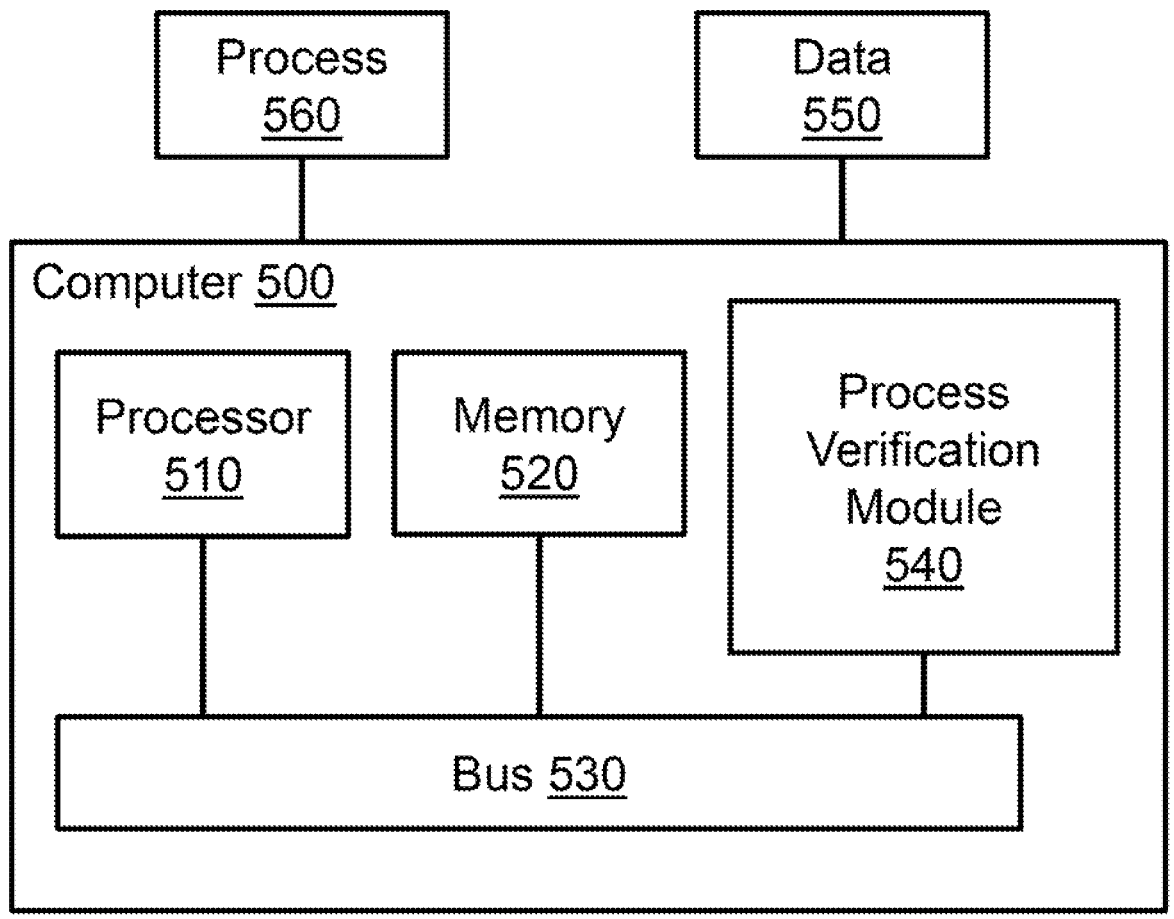
FIG. 5 illustrates an example computing device in which example systems, and methods, and equivalents, may operate.

FIG. 5 illustrates an example computing device in which example systems and methods, and equivalents, may operate. The example computing device may be a computer 500 that includes a processor 510 and a memory 520 connected by a bus 530. Computer 500 includes a process verification module 540. Process verification module 540 may perform, alone or in combination, various functions described above with reference to the example systems, methods, and so forth. In different examples, process verification module 540 may be implemented as a non-transitory computer-readable medium storing processor-executable instructions, in hardware, software, firmware, an application specific integrated circuit, and/or combinations thereof.

The instructions may also be presented to computer 500 as data 550 and/or process 560 that are temporarily stored in memory 520 and then executed by processor 510. The processor 510 may be a variety of processors including dual microprocessor and other multi-processor architectures. Memory 520 may include non-volatile memory (e.g., read-only memory, flash memory, memristor) and/or volatile memory (e.g., random access memory). Memory 520 may also be, for example, a magnetic disk drive, a solid state disk drive, a floppy disk drive, a tape drive, a flash memory card, an optical disk, and so on. Thus, memory 520 may store process 560 and/or data 550. Computer 500 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A system, comprising:
a process operating in a general operating environment of the system; and
an isolated environment comprising:
a protection module to modify the behavior of the process by modifying in memory executable instructions of the process while the process is in operation to trigger a predetermined expected change of behavior in the process, to determine whether the predetermined expected change of behavior occurs during operation of the process, to determine that the process is compromised upon determining that the predetermined expected change of behavior of the process has not occurred, and to take a remedial action upon determining that the process is compromised.

2. The system of claim 1, where the isolated environment is one of a TrustZone system on chip, a hypervisor, a system management mode module, and an embedded controller.

3. The system of claim 1, where the process is at least one of an antivirus process, a firewall process, an authentication process, a cryptography process, an intrusion prevention process, a digital rights management process, and an intrusion detection process.

4. The system of claim 1, where the remedial action is one of, alerting an entity that the process has been compromised, disabling a function of the system, restoring the process to a known valid state, and turning off the system.

5. The system of claim 1, where the protection module modifies the behavior of the process by at least one of:
altering a Boolean in memory to trigger whether a function of the process executes,
overwriting null operation instructions in the executable instructions associated with the process with instructions that call specific functions, where the null operation instructions were inserted in the process at compile time by a specially configured compiler,
overwriting a function call in the executable instructions of the process to trigger an alternative function call, and
altering a function pointer in memory.

6. The system of claim 1, where the protection module verifies the behavior of the process based on one of:
verifying a value received from the process, where the value is generated based on the behavior modified by the protection module,
verifying that security reports provided by the process to the protection module include data collected as a result of the behavior modification, and
verifying a state of in memory value modified by the process during the operation of the process, where the state depends on the modified behavior.

7. The system of claim 1, where the protection module is to receive instructions for modifying the behavior of the process from a remote device.

8. The system of claim 7, where the protection module reports a result of the verification to the remote device.

9. A non-transitory computer-readable medium storing executable instructions that, when executed, control a device to:
modify in memory, from a first environment of the device, executable instructions of a security process during execution of the security process at a second environment of the device to cause a predetermined expected behavior change in the security process;
monitor execution of the security process to detect the predetermined expected behavior change; and in response to failing to detect the predetermined expected behavior change, determine that the security process is compromised and perform a remedial action with the security process.

10. The non-transitory computer-readable medium of claim 9, where the first environment is an isolated environment, where the isolated environment is one of a Trustzone system on chip, a hypervisor, a system management mode module, and an embedded controller, and where the second environment is a primary processing environment of the device.

11. The non-transitory computer-readable medium of claim 10, where the executable instructions are modified by
  altering a Boolean in memory to trigger whether a function of the security process executes,
  overwriting null operation instructions in the executable instructions associated with the security process with instructions that call specific functions, where the null operation instructions were inserted in the security process at compile time by a specially configured compiler,
  overwriting a function call in the executable instructions to trigger an alternative function call, and
  altering a function pointer in memory.

12. The non-transitory computer-readable medium of claim 9, where verifying proper operation of the security process by one of:
  verifying a value received from the security process, where the value is generated based on the changed behavior,
  verifying that security reports provided by the security process include data collected as a result of the changed behavior, and
  verifying a state of in memory value modified by the security process during the operation of the security process, where the state depends on the changed behavior.

13. A method, comprising:
  alter, from a protected environment of a device, executable instructions of a security process in memory and under execution by a general operating environment of the device, where altering the executable instructions in memory triggers a predetermined expected behavior change in the security process;
  monitor execution of the security process to detect whether the security process exhibits the predetermined expected behavior change; and
  determine that the security process is compromised and restore the security process to a known valid state when the security process fails to exhibit the predetermined expected behavior change.

14. The method of claim 13, comprising:
  receiving directions from a remote device regarding how to modify the behavior of the security process;
  reporting results of the verification to the remote device; and
  receiving a signal directing the restoration of the security process from the remote device.

* * * * *